US008887856B2

(12) United States Patent  (10) Patent No.: US 8,887,856 B2
Janson  (45) Date of Patent: Nov. 18, 2014

(54) BEARING SUPPORT FOR A TRANSAXLE FINAL DRIVE ASSEMBLY

(71) Applicant: Ford Global Technologies, LLC, Dearborn, MI (US)

(72) Inventor: David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/850,516

(22) Filed: Mar. 26, 2013

(65) Prior Publication Data

US 2013/0210573 A1   Aug. 15, 2013

Related U.S. Application Data

(63) Continuation-in-part of application No. 11/937,652, filed on Nov. 9, 2007, now Pat. No. 8,544,588.

(51) Int. Cl.
*F16H 37/08* (2006.01)
*B60K 17/346* (2006.01)
*F16H 48/40* (2012.01)

(52) U.S. Cl.
CPC .......... *F16H 37/0806* (2013.01); *B60K 17/346* (2013.01); *F16H 2048/405* (2013.01)
USPC ........................................... 180/248; 475/343

(58) Field of Classification Search
CPC ....... B60K 17/16; B60K 17/346; F16H 37/08
USPC ................... 180/248, 249, 250, 233; 475/221
See application file for complete search history.

(56) References Cited

U.S. PATENT DOCUMENTS 5,833,566 A * 11/1998 Showalter ...................... 475/198
6,523,633 B1 * 2/2003 Teraoka et al. ............... 180/248

* cited by examiner

*Primary Examiner* — Joseph M Rocca
*Assistant Examiner* — Jacob Knutson
(74) *Attorney, Agent, or Firm* — James Dottavio; MacMillan, Sobanski & Todd, LLC

(57) ABSTRACT

A drive assembly for a vehicle powertrain includes a planetary gearset including an input and an output, for producing a speed reduction of the output relative to the input, a sprocket secured to the input, a differential housing secured to the output, a casing, a first bearing for supporting the sprocket for rotation on the casing, and a second bearing for supporting the differential housing for rotation relative to the sprocket.

20 Claims, 1 Drawing Sheet

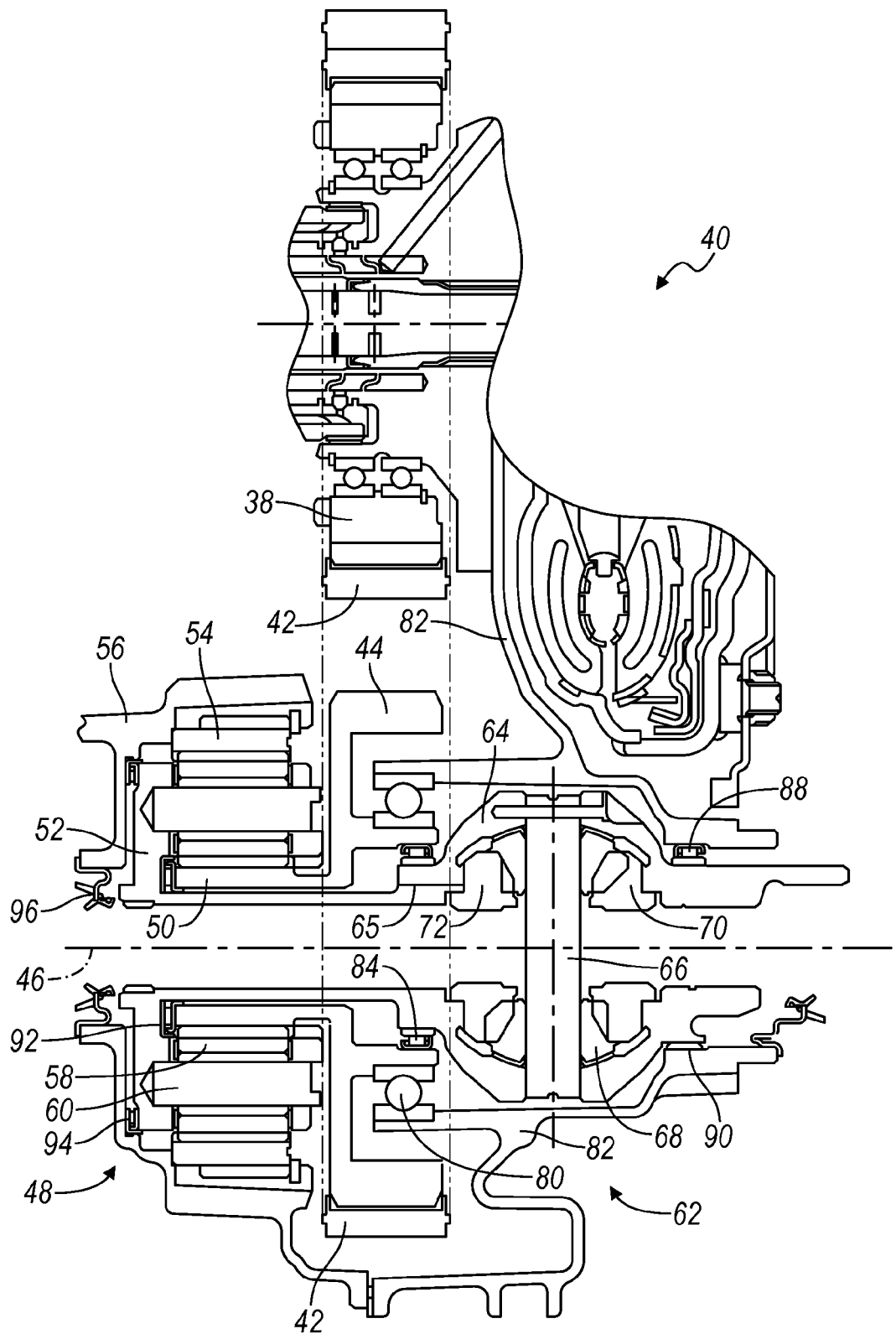

BEARING SUPPORT FOR A TRANSAXLE FINAL DRIVE ASSEMBLY

This is a continuation-in-part application of pending U.S. application Ser. No. 11/937,652, filed Nov. 9, 2007, the entire disclosure of which is incorporated herein by reference.

BACKGROUND OF THE INVENTION

1. Field of the Invention

This invention relates generally to a bearing support system for a transaxle having a chain drive connection to a transaxle output and a planetary final drive gear.

2. Description of the Prior Art

The output of a transaxle, arranged with its axis transverse with respect to the longitudinal axis of a motor vehicle, is driveably connected through a chain drive mechanism to the axis of the front wheels of the vehicle. The transaxle output is fitted with a first sprocket, engaged by a chain, which transmits torque to a second sprocket at the front wheel axis.

Conventionally the second sprocket is supported by a bearing on the housing of a differential, which transmits power to the front wheels. But tension in the chain causes unwanted bending of the differential housing in addition to the output torque of the transaxle that is transmitted by the chain to the differential housing.

Preferably a hydraulic pump that is driven by a torque converter of the transaxle is located away from the axis for the torque converter and the gearing in order to free axial space in the vehicle of the other components of the transaxle. But due to the lack of axial space and the increased number of forward speeds produced by transaxles, the torque converter is moved axial closer to the transaxle output sprocket, thereby limiting available space and optional locations for the final drive gearset.

If the planetary gearset is located at the left-hand side of the output sprocket in the transaxle, the sprocket is, according to the prior art supported by a bearing on the differential housing causing bending of the housing.

A need exists in the automotive industry for a final drive mechanism that avoids inducing bending in the differential housing due to chain tension and yet is compatible with changes in the arrangement of transaxle components that allow the axial dimension of the transaxle to be minimized.

SUMMARY OF THE INVENTION

A drive assembly for a vehicle powertrain includes a planetary gearset including an input and an output, for producing a speed reduction of the output relative to the input, a sprocket secured to the input, a differential housing secured to the output, a casing, a first bearing for supporting the sprocket for rotation on the casing, and a second bearing for supporting the differential housing for rotation relative to the sprocket.

The drive assembly avoids inducing bending in the differential housing due to chain tension. It accommodates changes in the arrangement of transaxle components that allow the axial dimension of the transaxle to be minimized.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a partial cross section taken through a transaxle for a motor vehicle showing the final drive assembly and its connection to the transaxle output.

DESCRIPTION OF THE PREFERRED EMBODIMENT

FIG. 1 illustrates that the output sprocket 38 of a transversely mounted, front wheel drive transaxle 40 is engaged by a drive chain 42, which also engages a sprocket 44 located at the axis 46 of the front wheels of the vehicle. Rotating power at the transaxle output sprocket 38 is transmitted by chain 42 to the sprocket 44.

A grounded planetary, final drive gearset 48 includes a sun gear 50, secured to sprocket 44; a carrier 52; a ring gear 54, held against rotation on transaxle case 56; and a set of planet pinions 58, each pinion 58 meshing with sun gear 50 and ring gear 54 and supported on one of the pinion shafts 60, each shaft 60 being is secured to carrier 52.

An inter-wheel, front differential 62 transmits power from carrier 52 differentially to right-hand and left-hand front wheels through the drive mechanism of differential 62, located in a differential housing 64. Carrier 52 is secured at 65 to differential housing 64. The drive mechanism includes a spindle 66; bevel pinion 68, supported to rotate about the axis of spindle 66 and to revolve about axis 46; and side bevel gears 70, 72, secured by a spline connected to right-hand and left-hand halfshafts (not shown), respectively. The halfshafts carry torque to the front wheels of the vehicle.

Sprocket 44 is supported by a ball bearing 80 on the torque converter case 82. Transaxle case 56 and torque converter case 82 are secured mutually and are supported on and secured to the vehicle's chassis, which prevents their rotation.

At the left-hand side of differential 62, differential housing 64 is supported on the sprocket 44 by a needle bearing 84, which is preferably aligned radially with bearing 80.

At the right-hand side of the differential 62, differential housing 64 is supported on the torque converter case 82 by a an antifriction device, which may be a needle bearing 88, as shown above axis 46, or a bushing 90, as shown below axis 46.

A needle thrust bearing 92 is located between carrier 52 and sun gear 50. A needle thrust bearing 94 is located between carrier 52 and the transaxle housing 56.

In operation, torque at the output sprocket 38 is transmitted by tension in chain 42 to sprocket 44. The final drive gearset 48 reduces the speed of carrier 52 relative to the speed of sprocket 44 and sun gear 50. Carrier 52 transmits torque along axis 46 between sun gear 50 and the left-hand halfshaft to the differential housing 64. An inter-wheel, front differential 62 transmits power from carrier 52 to right-hand and left-hand front wheels through the drive mechanism of differential 62.

Chain tension does not induce bending in differential housing 64 because tension in chain 42 that is transmitted to sprocket 44 is carried through bearing 80 to its reaction on torque converter case 82.

A dynamic seal 96, contacting the left-hand halfshaft and casing 56, and a seal 98, contacting the left-hand halfshaft and casing 56, protects against entry of contaminants into the final drive assembly at axis 46.

In accordance with the provisions of the patent statutes, the preferred embodiment has been described. However, it should be noted that the alternate embodiments can be practiced otherwise than as specifically illustrated and described.

The invention claimed is:

1. A drive assembly for a vehicle, comprising:
   a planetary gearset including an input and an output, for producing a speed reduction of the output relative to the input;
   a sprocket rotationally fixed to the input;
   a differential housing secured to the output;
   a casing;
   a first bearing supporting the sprocket for rotation on the casing;
   a second bearing contacting the sprocket, supporting the differential housing for rotation relative to the sprocket.

2. The assembly of claim 1, wherein the first bearing and the second bearing are mutually aligned and located in a plane substantially normal to an axis about which the sprocket rotates.

3. The assembly of claim 1, wherein:
   the input is a sun gear of the gearset;
   the output is a carrier of the gearset;
   and the gearset further includes a ring gear secured against rotation, and pinions supported for rotation on the carrier, the pinions meshing with the sun gear and the ring gear.

4. The assembly of claim 3, further comprising:
   a first thrust bearing located between the casing and the carrier; and
   a second thrust bearing located between the sprocket and the carrier.

5. The assembly of claim 1, further comprising:
   a transaxle including an output sprocket; and
   a chain engaged with the output sprocket and the sprocket for transmitting torque between the output sprocket and the sprocket.

6. The assembly of claim 1, wherein the sprocket, the gearset and the differential housing are arranged along an axis, the sprocket being located between the gearset and the differential housing.

7. The assembly of claim 1, wherein the differential housing contains a differential mechanism that distributes to vehicle wheels torque that is transmitted between the differential housing and the output.

8. A drive assembly for a vehicle, comprising:
   an output sprocket of a transaxle;
   a planetary gearset including an input and an output, for producing a speed reduction of the output relative to the input;
   a sprocket connected directly to the input;
   a chain engaged with the output sprocket and the sprocket for transmitting torque between the output sprocket and the sprocket;
   a differential housing secured to the output;
   a casing;
   a first bearing supporting the sprocket for rotation on the casing;
   a second bearing contacting the sprocket, supporting the differential housing for rotation.

9. The assembly of claim 8, wherein the first bearing and the second bearing are mutually aligned and located in a plane substantially normal to an axis about which the sprocket rotates.

10. The assembly of claim 8, wherein:
    the input is a sun gear of the gearset;
    the output is a carrier of the gearset;
    and the gearset further includes a ring gear secured against rotation, and pinions supported for rotation on the carrier, the pinions meshing with the sun gear and the ring gear.

11. The assembly of claim 10, further comprising:
    a first thrust bearing located between the casing and the carrier; and
    a second thrust bearing located between the sprocket and the carrier.

12. The assembly of claim 8, wherein the sprocket, the gearset and the differential housing are arranged along an axis, the sprocket being located between the gearset and the differential housing.

13. The assembly of claim 8, wherein the differential housing contains a differential mechanism that distributes to vehicle wheels torque that is transmitted between the differential housing and the output.

14. A drive assembly for a vehicle, comprising:
    an output sprocket of a transaxle;
    a sprocket;
    a chain engaged with the output sprocket and the sprocket;
    a differential housing;
    a casing;
    a first bearing supporting the sprocket for rotation on the casing;
    a second bearing contacting the sprocket, for supporting the differential housing for rotation;
    a planetary gearset including a carrier secured directly to the differential housing.

15. The assembly of claim 14, wherein the first bearing and the second bearing are mutually aligned and located in a plane substantially normal to an axis about which the sprocket rotates.

16. The assembly of claim 14, further comprising:
    the gearset including a sun gear secured to the sprocket for rotation therewith, a ring gear secured to the casing against rotation, and pinions supported on the carrier and meshing with the sun gear and the ring gear, the gearset producing a speed reduction of the carrier relative to a speed of the sun gear.

17. The assembly of claim 16, further comprising:
    a first thrust bearing located between the casing and the carrier; and
    a second thrust bearing located between the sprocket and the carrier.

18. The assembly of claim 14, wherein the sprocket, the gearset and the differential housing are arranged along an axis, the sprocket being located between the gearset and the differential housing.

19. The assembly of claim 14, wherein the differential housing contains a differential mechanism that distributes to vehicle wheels rotating power that is transmitted between the differential housing and the sprocket.

20. The assembly of claim 14, wherein the carrier is rotationally fixed to the differential housing.

* * * * *